June 3, 1930.  A. SITZMAN ET AL  1,761,848
CONCRETE BUILDING UNIT
Filed Sept. 28, 1928
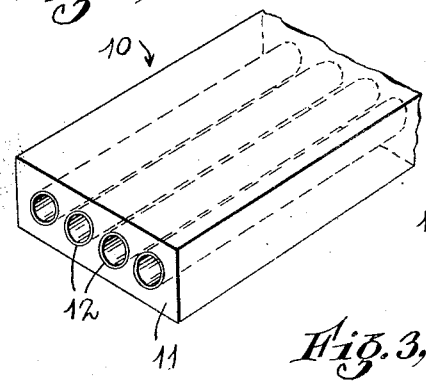
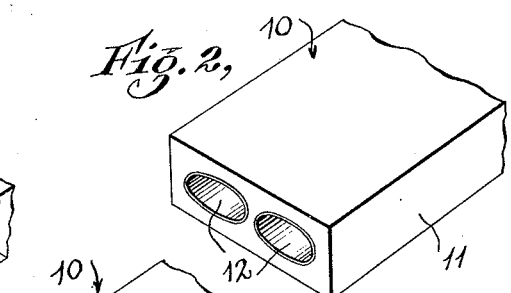
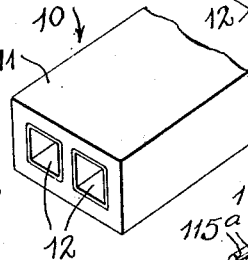
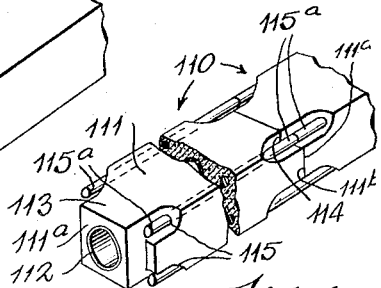
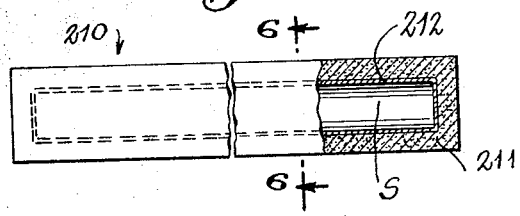
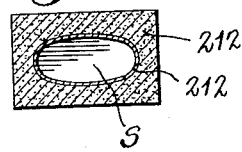
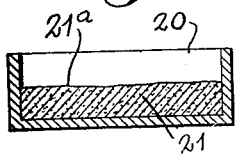
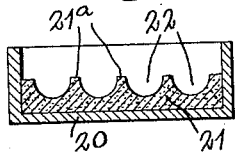
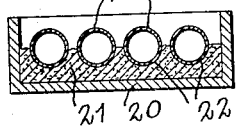
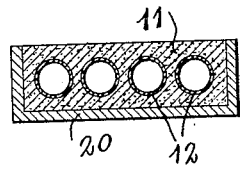
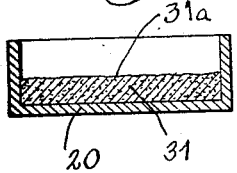
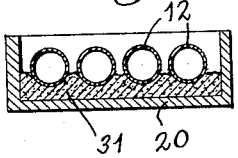
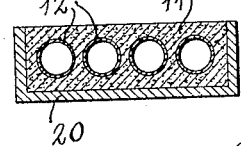
INVENTORS
ARTHUR SITZMAN &
EDWARD S. KLAUSNER
BY Louis Barnett
ATTORNEY Patented June 3, 1930

1,761,848

UNITED STATES PATENT OFFICE

ARTHUR SITZMAN, OF BROOKLYN, NEW YORK, AND EDWARD S. KLAUSNER, OF ASBURY PARK, NEW JERSEY

CONCRETE BUILDING UNIT

Application filed September 28, 1928. Serial No. 309,060.

This invention relates to the production of cement building units and more particularly is idrected to a novel process and article of manufacture comprising a building unit composed chiefly of either sand, gravel and cement, or sand, cinders and cement, or cinders and cement, or sand and cement or other similar cementitious material forming a "precast" hollow structure. The term "precast" as used hereinafter is applied to distinguish the class of building units that are made and sold in completed form from those structures cast or molded in the field of building operation.

Building units or blocks of "precast" hollow form as now produced require relatively expensive apparatus, skilled labor, and can only be made of limited lengths. The apparatus includes some form of hydraulic or other equivalent presses for compressing the material to be molded about a temporary core or cores which occupy the space the hollow is to form, sufficient pressure being applied to said material to give it enough strength for permitting the removal of the core or cores without collapsing the molding structure. In practice therefore, the molding of such "precast" units are limited to about twelve inches in length and requires relative high grade operators to carry out manufacturing process since the cement mixture must be carefully prepared and handled to avoid waste of the finished product.

It is one object of this invention to provide an improved production of "precast" building units of the character described which may be of any desired length and shall not be restricted by the process of manufacture as heretofore.

Another object of the invention is to provide a novel process of manufacturing "precast" building units of the character described which shall be simple and easy to carry out by relatively unskilled labor without causing waste of the finished products and which shall dispense with expensive and costly apparatus such as presses, elaborate molds and the like.

A further object of the invention is to provide a new article of manufacture comprising a "precast" hollow building unit having a rigid, non-metallic lining for the walls of the hollow portion, said unit being light, simple and cheap to produce, and practical and efficient to a high degree in use.

Other objects of this invention will in part be obvious and in part hereinafter pointed out.

The invention accordingly consists in the features of production, combinations of elements and arrangement of parts which will be exemplified in the constructions hereinafter described and of which the scope of application will be indicated in the following claims.

In the accompanying drawing, in which is shown various possible illustrative embodiments of this invention, Figs. 1, 2 and 3 are fragmentary perspective views showing portions of "precast" building units embodying the invention.

Fig. 4 is a fragmentary perspective view of a conduit using a modified construction of improved "precast" units embodying the invention.

Fig. 5 is a side elevational view of another modified form of construction of the improved "precast" building units, shown partly broken away to expose the interior.

Fig. 6 is a cross-sectional view taken on lines 6—6 in Fig. 5.

Figs. 7, 8, 9 and 10 are diagrammatic cross-sectional views showing the progressive steps taken in one method for producing the improved "precast" hollow building units, and Figs. 11, 12 and 13 are similar cross-sectional views showing the progressive steps of another method for producing the improved building units.

As seen from Figs. 1 to 3 of the drawing, 10 denotes a building unit constructed to embody the invention. Said unit is seen to comprise an elongated body 11 "precast" of suitable cementitious materials, as for example, in the manner hereinafter described. The body 11 may be of any desired length that is conveniently handled in building floors, walls and ceilings and is not limited or restricted in size or relative dimension by the process of manufacture as in the case of the ordinary building units or blocks of this type now found in general use.

Extending lengthwise through said body 11 there is one or more stiff, hollow members 12 formed of non-metallic sheet material seen to comprise a tubular structure preferably made of cardboard, pulp or straw board, plain or corrugated paper, fibre or other cheap material. Said member 12 is embedded in the body and forms a permanent hollow core therein.

Where it is desired to use the improved building units for a conduit, the construction may be modified as shown in Fig. 4. The conduit units 110 are each "precast" with a tubular core 112 permanently embedded in a cementitious body 111 like the unit 10 described above. The end surfaces 111$^a$ and 111$^b$ of said body through which the core 112 extends preferably are formed with suitable interlocking means for registering the cores of adjoining units in exact alignment. Said means are here shown as comprising extension portions 113 at the end 111$^a$ of the body and a recess 114 made to receive the extension portion 113 on the adjoining unit at the opposite end surface 111$^b$ of said body. Since it is often desirable to use relatively long lengths of conduits, the body 111 may be provided with one or more reinforcing bars 115 embedded in the body 111 to extend in spaced parallel relation to the core member 112. To facilitate handling the conduit units 111 in transportation and installation, the ends 114$^a$ of the bars are left exposed to serve as handles for lifting or moving the units. The bar ends 115$^a$ may be terminated flush with the end surfaces 111$^a$ and 111$^b$ so as not to interfere with the interlocking alignment of adjoining units as is readily understood from Fig. 4. The core members 112 for conduits are preferably impregnated with a suitable substance in any well understood manner to render them water or moisture proof or to form a practical dielectric.

In Figs. 5 and 6, a modified construction of "precast" building unit 210 is provided. Here the permanent hollow core 212 is made of the same material as the core 12 described above but forms a complete lining for the walls of the space S within the cementitious body 211 of said unit.

Novel processes for producing the improved building units will now be described.

Referring now to Figs. 7 to 10, inclusive, 20 denotes a mold cast of any well understood construction in which the improved building unit is to be "precast". A layer 21 of cementitious material preferable in semi-dry state is placed in the bottom of the cast. The top surface of said layer 21$^a$ is next impressed with one or more hollows or recesses 22 shaped to correspond to the contour of the hollow core 12. Hollow, non-metallic cores are then placed in the recesses 22. The mold is finally filled with cementitious material, levelled and pressed or tamped for permanently embedding the cores. The cores being light are easy to handle and are made sufficiently rigid to retain the hollow shaped space during the molding operation.

In Figs. 11 to 13, inclusive, another simplified method for producing the improved units is shown. Here the mold cast building unit 20 is partially filled with a layer 31 of wet cementitious material. The hollow cores 12 are placed in a desired spaced position on the top surface 31$^a$ of said layer and the mold filled with cementitious material for permanently embedding the cores.

In both methods the cementitious material when dry and hardened form the body 11 of the improved "precast" building unit.

Since the cores are not removed and form a permanent part of the improved units, the latter may be made any length desired and are not restricted by the process of manufacture to a size determined by the practical limitation to which the cores can be removed which form a building hollow unit of standard construction and are approximately twelve inches in length.

While in the above methods the molding is carried out with the cores lying in a substantial horizontal plane, which has been found more convenient for producing relatively long units, it is to be understood that these methods may be modified for casting the units with the cores in an upright or substantially vertical position.

It should be noted that in using permanent cores in the improved constructions no provision need be made for retaining the shape of the hollows during the molding operation since the cores reinforce the bodies, the walls may therefore be made of minimum thickness and the voids or hollows relatively larger than is possible with the standard constructions. Thus the walls of the box may be relatively thin and of insufficient strength of itself to retain the shape of the unit during the molding operation, since the hollow cores prevent the collapse of the walls during the molding and until the cementitious material has hardened. As a result less material and a lighter building unit can be produced than by the standard methods of manufacture.

Thus simple, cheap and economical sized "precast" reinforced hollow building units are provided which are easy to produce, require no other apparatus except a mixer, mold and other small hand tools operated by relatively unskilled labor and which can be made the most economically in bulk and dimensions for erection and transportation since their sizes are not limited or restricted in process of manufacture.

It will thus be seen that there is provided an article and process in which the several objects of this invention are achieved and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described our invention, we claim as new and desire to secure by Letters Patent:

1. A building unit of the character described comprising a precast cementitious elongated body, a stiff tubular non-metallic member permanently embedded lengthwise through said body, and reinforcing means parallelly spaced from said member embedded in said body, the ends of said means being exposed as and for the purpose described and specified.

2. A building unit of the character described comprising a precast cementitious elongated body, a stiff, tubular, non-metallic member permanently embedded lengthwise through said body, means formed at the ends of said unit for interlocking the latter with the ends of other abutting units, and a bar parallelly spaced from said member embedded in said body, said bar having an end exposed to serve as handling means.

3. A building unit of the character described comprising a cementitious body precast with a permanent stiff hollow core of non-metallic material extending therethrough from end to end, the wall of said body being relatively thin and of insufficient strength of itself to retain the shape of the unit during the molding operation.

4. A building unit of the character described comprising a precast cementitious elongated body, a stiff tubular non-metallic member permanently embedded lengthwise through said body, and reinforcing means parallelly spaced from said member embedded in said body, the ends of said means being exposed, the wall thickness of said body surrounding said member being substantially less than is required to retain the shape of the unit during the molding operation.

5. A building unit of the character described comprising a precast cementitious elongated body, a stiff, tubular non-metallic member permanently embedded lengthwise through said body, means formed at the ends of said unit for interlocking the latter with the ends of other abutting units, and a bar parallelly spaced from said member embedded in said body, said bar having an end exposed to serve as handling means, the said wall body being relatively thin and of insufficient strength of itself to retain the shape of the unit during the molding operation.

In testimony whereof we affix our signatures.

ARTHUR SITZMAN.
EDW. S. KLAUSNER.